(12) United States Patent
Muhlhoff, Jr. et al.

(10) Patent No.: US 9,561,692 B2
(45) Date of Patent: Feb. 7, 2017

(54) ANTI-NOISE DEVICE FOR TIRE

(71) Applicants: COMPAGNIE GENERALE DES ETABLISSEMENTS MICHELIN, Clermont-Ferrand (FR); MICHELIN RECHERCHE ET TECHNIQUE, S.A., Granges-Paccot (CH)

(72) Inventors: Olivier Muhlhoff, Jr., Clermont-Ferrand (FR); Francois-Xavier Bruneau, Clermont-Ferrand (FR); Frederic Bourgeois, Clermont-Ferrand (FR)

(73) Assignees: COMPAGNIE GENERALE DES ETABLISSMENTS MICHELIN (FR); MICHELIN RECHERCHE ET TECHNIQUE, S.A. (CH)

( * ) Notice: Subject to any disclaimer, the term of this patent is extended or adjusted under 35 U.S.C. 154(b) by 249 days.

(21) Appl. No.: 14/401,901

(22) PCT Filed: May 13, 2013

(86) PCT No.: PCT/EP2013/059844
§ 371 (c)(1),
(2) Date: Nov. 18, 2014

(87) PCT Pub. No.: WO2013/171172
PCT Pub. Date: Nov. 21, 2013

(65) Prior Publication Data
US 2015/0136289 A1    May 21, 2015

(30) Foreign Application Priority Data

May 18, 2012 (FR) ..................... 12 54554

(51) Int. Cl.
*B60C 11/13* (2006.01)
*B60C 11/03* (2006.01)

(52) U.S. Cl.
CPC ........ *B60C 11/1307* (2013.04); *B60C 11/0309* (2013.04); *B60C 2011/1338* (2013.04)

(58) Field of Classification Search
CPC ........... B60C 11/1307; B60C 2011/133; B60C 2011/1338; B60C 11/0309
(Continued)

(56) References Cited

U.S. PATENT DOCUMENTS 2,661,041 A * 12/1953 Walsh ................. B60C 11/0309
152/209.21
2,756,797 A *  7/1956 Campbell ........... B60C 11/0309
152/209.18
(Continued)

FOREIGN PATENT DOCUMENTS

DE   EP 2377696 A2 * 10/2011  ......... B60C 11/0309
EP       1946943 A1    7/2008
(Continued)

OTHER PUBLICATIONS

International Search Report for PCT/EP2013/059844 Dated Jun. 14, 2013.

*Primary Examiner* — Timothy Kennedy
(74) *Attorney, Agent, or Firm* — Dickinson Wright PLLC

(57) ABSTRACT

Tread comprising at least one groove delimited by two walls facing one another, joined together by a groove bottom, this groove having a plurality of closure devices, each made up of at least one flexible blade (of thickness E suited to allowing flexing under the effect of a circulation of liquid in the groove, and secured to a wall delimiting the groove, each flexible blade bounded by a bottom wall facing the bottom of the groove, an end wall facing the other wall of the groove and a contact wall to come into contact with the roadway and lateral walls spaced apart from one another by a distance equal to the thickness E of the blade, the bottom wall of each flexible blade having a notch in the vicinity of the wall to (Continued)

which the blade is attached, wherein each flexible blade is connected to one of the walls delimiting the groove inside a housing (formed on the wall bearing the blade, each housing having a depth suited to containing in its entirety a notch.

6 Claims, 2 Drawing Sheets

(58) Field of Classification Search
 USPC ..................................... 152/209.18, 209.21
 See application file for complete search history.

(56) References Cited

U.S. PATENT DOCUMENTS

| | | | | |
|---|---|---|---|---|
| 5,503,207 A | * | 4/1996 | Ochiai | B60C 11/1369 152/209.21 |
| 6,006,804 A | * | 12/1999 | Yokota | B60C 11/0309 152/209.19 |
| 6,119,744 A | * | 9/2000 | Tsukagoshi | B60C 11/0309 152/209.19 |
| 6,484,772 B1 | * | 11/2002 | De Labareyre | B29D 30/52 152/209.17 |
| 2010/0307650 A1 | * | 12/2010 | De Benedittis | B60C 11/0306 152/209.18 |
| 2011/0126952 A1 | * | 6/2011 | Nakamizo | B60C 11/0309 152/209.21 |
| 2013/0306209 A1 | * | 11/2013 | Bonnamour | B60C 11/1218 152/209.21 |

FOREIGN PATENT DOCUMENTS

| | | | | |
|---|---|---|---|---|
| FR | 1568434 A | * | 5/1969 | ......... B60C 11/0309 |
| FR | 2961744 A1 | | 12/2011 | |
| JP | 60116510 A | | 6/1985 | |
| JP | 10250317 A | | 9/1998 | |

* cited by examiner

ANTI-NOISE DEVICE FOR TIRE

This application is a 371 national phase entry of PCT/EP2013/059844, filed 13 May 2013, which claims benefit of French Patent Application No. 1254554, filed 18 May 2012, the entire contents of which are incorporated herein by reference.

BACKGROUND

1. Field

The present disclosure relates to tire treads and more particularly to treads comprising grooves comprising closure devices for reducing the noise generated by air going into resonance inside these grooves during driving.

2. Description of Related Art

It is known that as a tire that is running comes into contact with a roadway in the contact patch, air is made to circulate in each groove, notably grooves of circumferential overall orientation. With the roadway, each groove forms a pipe having two open ends.

The air in this pipe forms a vibrating column of air the resonant frequency of which is dependent on the length separating the two ends of the pipe and therefore on the length of groove in contact with the roadway.

This resonance of the air in the grooves has the result of generating, in a vehicle fitted with these tires, a noise that can be heard inside the vehicle and outside the vehicle. These inside and outside noises usually correspond to a frequency of 1 kHz or thereabouts, which is a frequency to which the human ear is particularly sensitive.

In order to reduce such noise of resonance, it is known practice to arrange, in each circumferentially oriented or generally circumferentially oriented groove, a plurality of relatively thin flexible blades or membranes made of a rubber composition, each flexible blade or membrane occupying the entire cross section of the groove or, at least, a large proportion of this cross section in order to form a closure device.

Each flexible blade may extend from the bottom of the groove or may be fixed to at least one of the walls that delimit the said groove. Relatively thin means that each flexible blade is able to flex in order to open the cross section of the groove under the effect of a flow of liquid notably when driving in the wet.

Thanks to these flexible blades, the length of the column of air in each circumferential groove is reduced by comparison with the total length of the groove in the contact patch, and this leads to a change in the resonant frequency. The shift in frequency is towards resonant-frequency values to which the human ear is less sensitive.

Of course, in order to maintain the water-drainage function, when driving on a roadway covered with water, it is necessary for this membrane to be able to flex appropriately under the action of the pressure of the water and thus open the cross section of the groove in a way that is appropriate to allowing a sufficient flow of liquid.

DEFINITIONS

A block is a raised element formed on the tread and delimited by voids or grooves and comprising lateral walls and a contact face intended to come into contact with the roadway. This contact face has a geometric centre defined as the barycentre or centre of gravity of the face.

A rib is a raised element formed on a tread, this element extending in the circumferential direction and making a complete circuit of the tire. A rib comprises two lateral walls and a contact face, the latter being intended to come into contact with the roadway during driving.

A radial direction in this document means a direction which is perpendicular to the axis of rotation of the tire (this direction corresponds to the direction of the thickness of the tread).

A transverse or axial direction means a direction parallel to the axis of rotation of the tire.

A circumferential direction means a direction tangential to any circle centred on the axis of rotation. This direction is perpendicular both to the axial direction and to a radial direction.

Axially outwards means a direction oriented towards the outside of the internal cavity of the tire.

Equatorial plane: plane perpendicular to the axis of rotation and passing through the axially outermost points of the tire, this equatorial plane virtually dividing the tire into two substantially equal halves.

The usual running conditions or conditions of use of the tire are those defined by the ETRTO standard; these conditions of use specify the reference inflation pressure corresponding to the load bearing capability of the tire as indicated by its load rating and speed rating. These conditions of use may also be referred to as "nominal conditions" or "usual conditions".

A cut generically denotes either a groove or a sipe and corresponds to the space delimited by walls of material that face one another and are distant from one another by a non-zero distance (referred to as the "width of the cut"). It is precisely this distance that differentiates a sipe from a groove; in the case of a sipe, this distance is suited to allowing the opposing walls that delimit the said sipe to come into at least partial contact at least in the contact patch in which the tire is in contact with the roadway. In the case of a groove, the walls of this groove cannot come into contact with one another under usual running conditions.

The tread surface of a tread corresponds to the surface of the tread that comes into contact with the ground when a tire provided with such a tread is being driven on.

In the case of flexible blades fixed to one of the walls delimiting a groove, as described in patent document FR2715891, one problem encountered is in molding and demolding the tire provided with the said blades.

The applicants of the present application have, in an application as yet unpublished at the date of filing of the present application, described a groove closure device which is easier to mold and demold by comparison with the known devices formed of blades secured to one of the walls delimiting a groove. According to this application and as can be seen in FIG. 1 appended to the present application, there is proposed a tire tread, this tread having a tread surface intended to come into contact with a roadway and comprising at least one groove 1 of width W and depth P delimited by two walls 20, 30 facing one another, these walls being joined together by a groove bottom 10, at least one groove comprising a plurality of closure devices, formed for example of two flexible blades 4, 4' for closing this groove as it enters the contact patch in which the tire is in contact with a roadway, each blade having a thickness suited to allowing it to flex under the effect of a circulation of liquid. This flexible blade is borne by one of the walls delimiting the groove.

Each blade of thickness E is bounded by a bottom wall 40 facing the bottom of the groove, an end wall 41 facing the other wall of the groove and a contact wall 42 intended to come into contact with the roadway and lateral walls spaced apart from one another by a distance equal to the thickness E of the blade. The tread according to this teaching is such that the bottom wall of the blade comprises a first part 401 referred to as the connection part and a second part 402 extending the first part as far as the end part of the blade, the connection part being offset towards the outside of the tread (namely towards the tread surface) with respect to the second part of the bottom wall of the blade. In this way, a notch is formed in the bottom wall of the blade and that is near the wall to which the blade is attached, this notch being attached to a lateral wall bounding the groove. The presence of this notch, in addition to making the tread easier to demold, increases the flexibility of the blade when running by generating a smaller hinge. This increase in flexibility is a combined function of the height of the notch and of the width of the notch. The height of the notch is measured in the direction of the depth of the groove. The width of the notch is measured in the direction of the width W of the groove.

In the context of this other application, the expression "wall bearing the blade" can be interpreted as denoting one of the lateral walls delimiting the groove.

While this other application does make it possible to reduce demolding effort, it would seem that the cross section of the groove is no longer entirely closed off by this closure device because of the presence of a notch on each blade. As a result, the noise-reducing performance is thereby diminished because the resonant pipe is no longer completely closed.

SUMMARY

The present disclosure is an improvement of the latter teaching and seeks both to obtain ease of molding and demolding of the flexible blades that form the closure device closing the grooves and fullest possible closure of the cross section of each groove in which the said devices are formed.

To this end, the subject of an embodiment of the invention is a tire tread, this tread having a tread surface intended to come into contact with a roadway and comprising at least one groove of width W and depth P delimited by two walls facing one another, these walls being joined together by a groove bottom, at least one groove comprising a plurality of closure devices, each closure device being made up of at least one flexible blade for at least partially closing this groove as it enters the contact patch in which the tire is in contact with a roadway, each blade having a thickness E suited to allowing it to flex under the effect of a circulation of liquid in the groove, this at least one blade being secured to a wall delimiting the groove.

Each blade of thickness E is bounded by a bottom wall facing the bottom of the groove, an end wall facing the other wall of the groove and a contact wall intended to come into contact with the roadway and lateral walls spaced apart from one another by a distance equal to the thickness E of the blade, the bottom wall of each flexible blade comprising a notch situated in the vicinity of the wall to which the blade is attached respectively.

This tread is characterized in that each blade is connected to one of the walls delimiting the groove inside a housing formed on the wall bearing the said blade, each housing extending over at least the entire height of the blade and having a depth—measured with respect to the wall delimiting the groove—suited to containing in its entirety the notch formed on the bottom wall of each blade of the closure device.

In the context of the invention, the expression "wall bearing the blade" is to be interpreted as meaning the one of the lateral walls delimiting the groove to which the flexible blade of the closure device is connected at the time of molding of the tread. The height of a flexible blade means the length of this blade measured between the point on the blade that is closest to the tread surface and the point on the blade that is closest to the bottom of the groove.

The fact that the notch is entirely contained inside the housing ensures complete coverage of the cross section of the groove for which a reduction in air resonance noise during driving is sought.

The height of the notch is measured in the direction of the depth of the groove. The width of the notch is measured in the direction of the width of the groove.

This device may advantageously be implemented on any type of groove, whether this groove is oriented circumferentially, transversely or obliquely.

Advantageously, with the bottom wall of each flexible blade comprising a second part in the continuation of the notch, the profile of this second part of the bottom wall of the blade is parallel to the profile of the bottom of the groove and this second part is situated as close as possible to the said bottom.

In one alternative form of the invention, the housing of each flexible blade is designed to extend between the tread surface in the initial state and the bottom of the groove. For greater effectiveness, it is sensible to extend each flexible blade as far as the tread surface as new or even to extend it slightly beyond that.

Advantageously, the bottom of the groove furthermore comprises a housing into which the bottom wall of the blade may be inserted. Of course, provision must be made for each blade to enter into this housing molded in the groove bottom over only a very small height, the reason being so as to allow easy disengagement when driving on a wet surface in order to allow the water to flow along the groove. Under these conditions, and as a result of the elasticity of the rubbery material, return to the initial position is also possible given the small amount of friction between the bottom wall of the blade and the bottom of the groove. With this alternative form, the groove can be completely closed.

When at least one of the walls of the groove makes an angle different from zero degrees with respect to a direction perpendicular to the tread surface, it is advantageous for each housing inside which a flexible blade of a closure device is fixed to have a depth—measured with respect to the wall on which it is formed—which can vary in the direction of the depth of the groove. It is advantageous for this depth to decrease in the direction towards the tread surface in the initial state. In this way, the bottom of the housing follows a line substantially perpendicular to the tread surface. Thus, in the case of a groove delimited by walls with an undercut (in which the width of the groove increases with depth), the depth of the housing will decrease from the tread surface towards the bottom of the groove.

In order to close off the cross section of the groove more fully in the case of a closure device comprising just one blade for closing off the cross section of the groove, it is sensible also to provide a housing on the opposite wall to the wall bearing the flexible blade so that the end wall of the said blade can be housed. The features described for a housing provided in the bottom of the groove are applied here. In this way, the cross section of the groove can be completely closed off, especially if each flexible blade extends as far as the tread surface or even slightly beyond.

Other features and advantages of embodiments of the invention will become apparent from the description given hereinafter with reference to the attached drawings which, by way of nonlimiting examples, show embodiments of the subject matter of the invention.

DETAILED DESCRIPTION OF SPECIFIC EMBODIMENTS

In the figures accompanying this description, the same reference signs can be used to describe alternative forms of the invention as long as these reference signs refer to elements of a like nature, whether this nature be structural or indeed functional.

Figure 1:
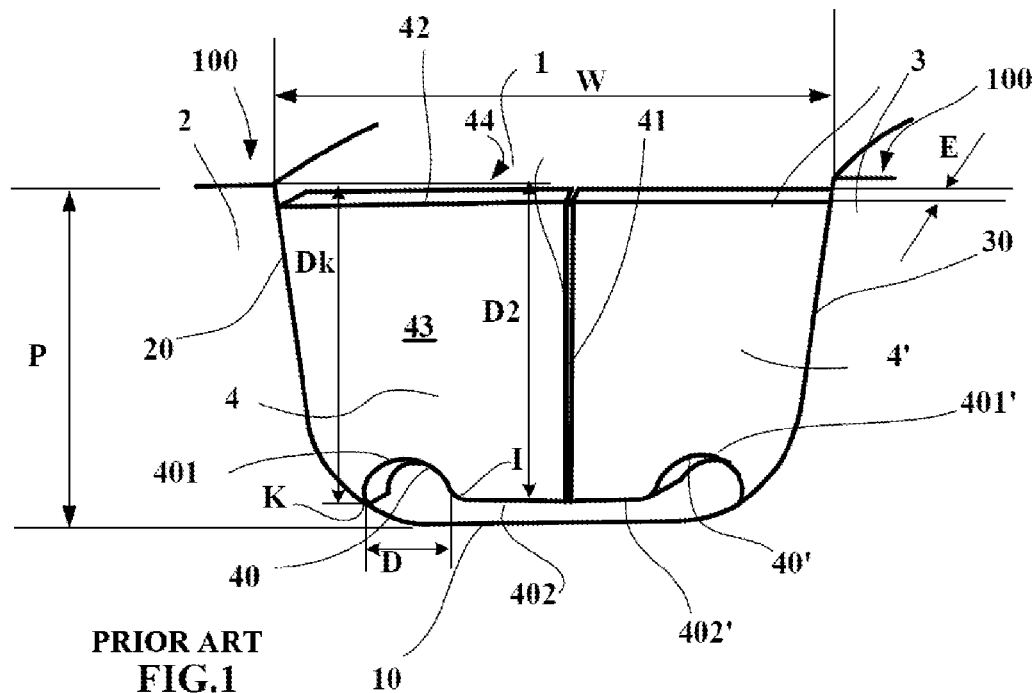
FIG. 1 shows an alternative form of a device of the other application comprising two flexible blades forming a groove closure device.

FIG. 1 shows, in cross section, a partial view of a tread according to the invention with which a tire of size 225/55 R 17 is equipped. This figure depicts a groove 1 bounded by two raised elements 2, 3 of the tread, this groove extending substantially in a circumferential direction of the tire on which the said tread is mounted. This groove 1, of width W—measured on the tread surface in the new condition—equal to 13 mm and of depth P equal to 7.5 mm, is bounded by a first wall 20 and a second wall 30 which face one another and by a groove bottom 10 connecting the said two walls together. The tread comprises a tread surface 100 intended to be in contact with a roadway during driving. In what follows, the bottom wall of the groove corresponds to that part of the groove that remains after the tread has worn down to the legal limit set by national regulations.

This groove 1 comprises an anti-noise device formed of a plurality of flexible blades molded in the said groove and intended to close off the cross section of this groove. Each device comprises two blades 4, 4' each occupying substantially half the cross section of the groove 1, these blades 4, 4' lying in the extension of one another. Each blade 4, 4' projects from a respective wall 20, 30.

Molded into the first wall 20 is a first blade 4 of a thickness that is small (which in this instance means a thickness equal to 0.6 mm) so that it can easily flex about an axis more or less along the connection between this first blade 4 and the wall 20 to which it is connected with a view to allowing water to flow along the groove 1 when driving over a wet roadway while at the same time forming an obstacle against the circulation of air when driving on a dry roadway.

This first blade 4 is bounded by a bottom wall 40 facing the bottom 10 of the groove, an end wall 41 facing the second wall 30 delimiting the groove 1 and a contact wall 42 which is intended to come into contact with the roadway and lateral walls 43, 44 which are spaced apart by a distance equal to the thickness of the blade.

The bottom wall 40 of the first blade 4 comprises a first part referred to as the connection part 401 connecting with the wall 20 bearing this blade, this connection part 401 having a semicircular profile, its centre of curvature being located on the same side as the bottom 10 of the groove and its diameter D of curvature in this instance being equal to 2 mm, namely 34% of the width W of the groove.

"Located on the same side as the bottom 10 of the groove" is to be understood as meaning that the connection part 401 forms a kind of notch in the blade, the concavity of this notch facing towards the bottom 10 of the groove 1. Moreover, the connection part 401 is extended by a substantially rectilinear additional part 402 as far as the end part 41 of the blade 4.

The junction between the connection part 401 and the additional part 402 occurs—in the view of FIG. 1—at a point of inflexion I. The connection part 401 terminates at its other end on the lateral wall 20 at a point K which is situated a distance Dk from the tread surface in the new state which distance is greater than the total thickness of material that can be worn away on a vehicle after running before the tire has to be replaced (in this instance, Dk is equal to 7.3 mm).

It will be noted that, for the most part, all of the points of the connection part 401 forming a notch—with the notable exception of the point K of connection between this connection part 401 and the wall 20 bearing the blade 4 and of the point I in common with the additional part 402 of the bottom wall of the blade—are closer to the tread surface 100 in the new state than are the points of the additional part 402 with respect to that same tread surface.

Formed in combination with this first blade 4 is a second blade 4' of the same geometry, this second blade 4' being connected to the second wall 30 situated facing the first wall 4 so as to obstruct the cross section of the groove 1 almost completely. In the scenario depicted, the first blade 4 and the second blade 4' are formed in such a way as to have their respective end parts facing one another and in contact with one another after the tread has been molded.

Thanks to the presence of a notch on each blade, it is easier to mold a plurality of blades that make up a closure device for attenuating resonant air noise in the groove.

Moreover, and as a person skilled in the art will be able to imagine, when the tread has worn sufficiently to reach the points of the connection part that are situated closest to the tread surface, the blades detach from the tread and thus open the entire remaining cross section of the groove, which is beneficial from the standpoint of the ability of liquid to flow along the remaining groove.

Figure 2:
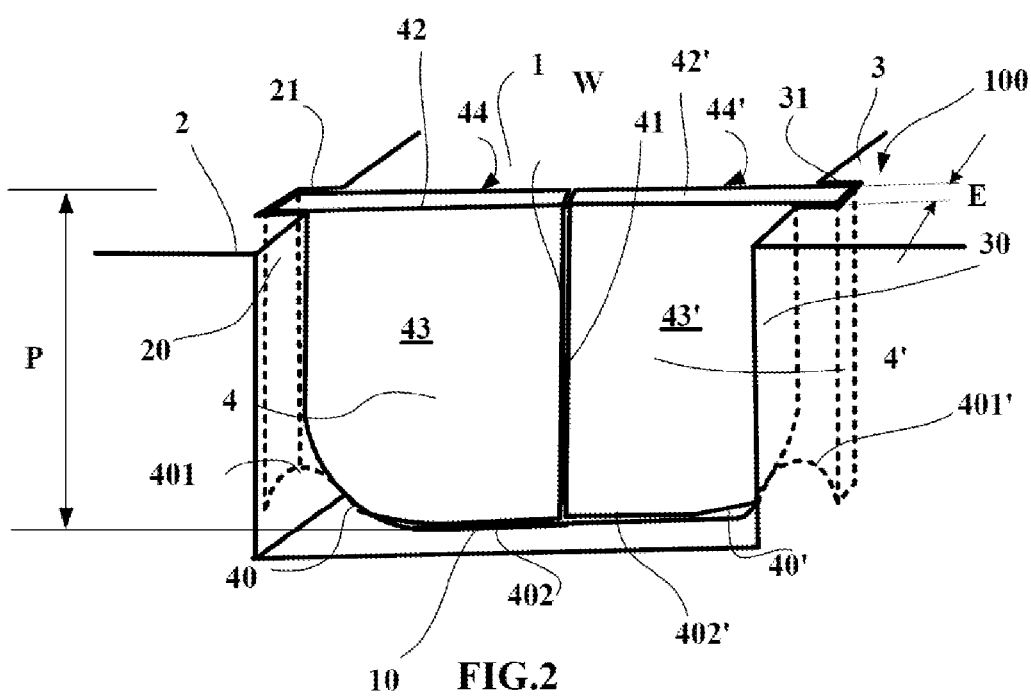
FIG. 2 shows an alternative form according to an embodiment of the invention of a closure device similar to that shown in FIG. 1.

In the alternative form of the invention shown in FIG. 2, the anti-noise device is, in a similar way to what was described with the support of FIG. 1, made up of a plurality of pairs of flexible blades 4, 4', a first blade 4 being secured to a wall 20 delimiting the groove 1 and a second blade 4' being secured to the wall 30 opposite. The numerical references of this FIG. 2 refer to the same parts as in FIG. 1. The geometric characteristics of the blades 4, 4' are substantially identical to those of the blades of the alternative form shown in FIG. 1 except that each of these blades 4, 4' is connected to one of the walls delimiting the groove 1 in a housing 21, 31 made in the respective walls 20 and 30.

The depth of each housing, measured substantially at right angles to the wall delimiting the groove, is sufficient that each notch 401, 401' is situated completely inside a housing. Therefore the depth of the housing in the first wall 20 is at least equal to the diameter D of the notch 401. The width of each housing is sufficient to allow a blade of thickness E to be anchored therein. Advantageously, the shape of each housing may be suited to allowing easy flexing of the blade anchored in the said housing.

Furthermore, the bottom wall 40, 40' of each blade 4, 4' is designed to be as close as possible to the bottom wall 10 of the groove 1 (in this instance of the order of 0.5 mm) so that these blades 4, 4' close off the cross section of the said groove as much as possible. In this alternative form, each housing opens onto the tread surface 100 and extends as far as a depth equal to the depth P of the groove 1.

Figure 3:
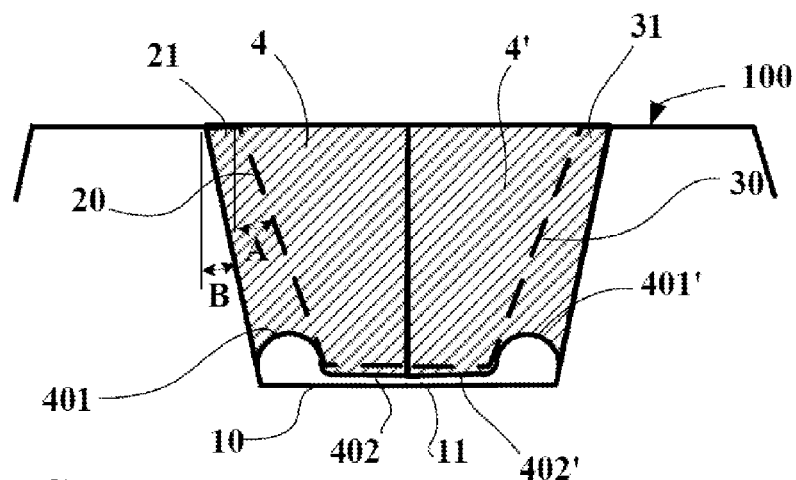
FIG. 3 shows a second alternative form of tread according to an embodiment of the invention, this alternative form being suited to the case of a groove the walls of which make an angle significantly different from 90 degrees with the tread surface.
Figure 4:
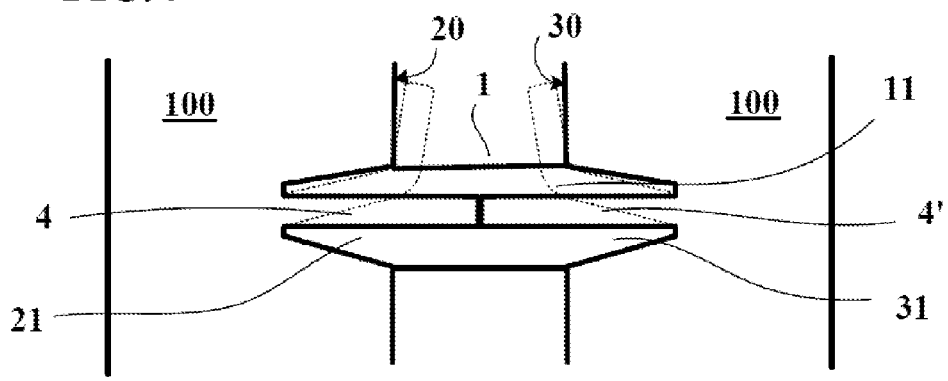
FIG. 4 shows a view of the tread surface corresponding to the alternative form of FIG. 3.

In the alternative form according to the invention shown in FIG. 3 which shows a view in cross section and FIG. 4 which shows a surface view, there can again be seen the closure device of FIG. 2 with two flexible blades, this device comprising two advantageous special features. Specifically, formed in the bottom 10 of the groove 1 is a housing 11 in the form of a groove of shallow depth (in this instance a depth at most equal to 1 mm). This housing 11 is designed to lie in the continuation of the housings 21 and 31 formed in the lateral walls 20 and 30 delimiting the groove 1. Thus, the flexible blades 4 and 4' of the closure device are secured to the lateral walls 20 and 30 inside the respective housings 21 and 31 and these same flexible blades have their bottom walls 40 and 40' designed to enter the housing 11 formed in the bottom 10 of the groove.

In the scenario depicted in FIG. 3, it may be seen that the lateral walls 20 and 30 delimiting the groove 1 are inclined by an angle A with respect to a perpendicular to the tread surface 100 and that the housing in which a blade is fixed is also inclined by an angle B less than the angle A with respect to the same perpendicular. Thus, the depth of each housing 21, 31, in which a flexible blade of the closure device is fixed, decreases from the bottom 10 of the groove towards the tread surface 100.

Furthermore, and as shown by FIG. 4 which is a view from above of the device shown in FIG. 3, the lateral walls delimiting the housings 21 and 31 on the lateral walls delimiting the groove diverge from one another to make it easier for the flexible blades of the closure device to open. When driving on a roadway that is not wet, the blades remain in the position as depicted in FIG. 4. When driving on a wet roadway, the flow of liquid causes the blades to leave the housing 11 formed in the bottom of the groove and flex to the geometry depicted in dotted line in FIG. 4.

Figure 5:
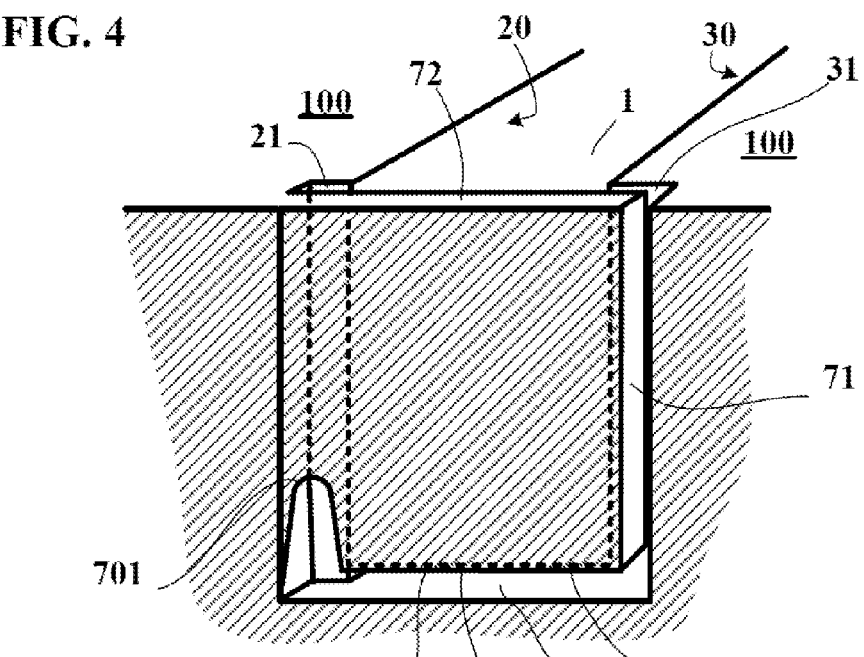
FIG. 5 shows a third alternative form whereby the end wall and the bottom wall of a flexible blade are housed in suitable housings.

In the alternative form shown in FIG. 5, each device for closing a groove 1 is made up of a single flexible blade 7 connected to the tread by one of its lateral walls formed inside a housing 21 made in a lateral wall 20 delimiting the groove 1, this housing 21 being of dimensions that are suitable for the notch 701 formed on the flexible blade 7 to be completely contained in the said housing 21. Furthermore, the other end wall 71 of the blade 7 and the bottom wall 70 are situated inside respective housings 31 and 11 so as to achieve full closure of the groove 1 in the new state (this blade 7 having its contact wall 72 situated at the tread surface 100). The notch 701 is extended by a part 702 to form the bottom wall of the blade 7.

As the invention has been described in general terms and using a number of alternative forms, it should be understood that this invention is not restricted only to these alternative forms described and depicted. The various alternative forms described here can be combined with one another by a person skilled in the art to suit the end objective.

It is clear that various modifications can be made without departing from the general scope of the present invention. In particular it is possible to form a closure device comprising at least two blades according to the invention, these blades being offset from one another in the main direction of the groove in which the said closure device is formed (the main direction of the groove corresponding to the direction in which a stream of liquid flows).

The invention claimed is:

1. A tire tread, comprising:
 a tread surface intended to come into contact with a roadway, and
 at least one groove of width W and depth P delimited by two walls facing one another, these walls being joined together by a groove bottom, comprising:
  a plurality of closure devices, each closure device being made up of at least one flexible blade adapted to at least partially closing this groove as it enters the contact patch in which the tire is in contact with a roadway,
  wherein each flexible blade has a thickness E suited to allowing it to flex under the effect of a circulation of liquid in the groove,
  wherein the at least one flexible blade is secured to a wall delimiting the groove,
  wherein each flexible blade of thickness E is bounded by a bottom wall facing the bottom of the groove, an end wall facing the other wall of the groove, and a contact wall adapted to come into contact with the roadway, and lateral walls spaced apart from one another by a distance equal to the thickness E of the blade,
  wherein the bottom wall of each flexible blade comprises a notch situated in the vicinity of the wall to which the blade is attached respectively,
  wherein each flexible blade is connected to one of the walls delimiting the groove inside a housing formed on the wall bearing the blade,
  wherein each housing extends over at least the entire height of the blade and has a depth—measured at right angles to the wall delimiting the groove adapted to contain in its entirety the notch formed on the bottom wall of each blade of the closure device.

2. The tire tread according to claim 1, wherein the bottom wall of each flexible blade comprises a second part in the continuation of the notch, wherein the profile of this second part is parallel to the bottom of the groove and situated as close as possible to the bottom.

3. The tire tread according to claim 1, wherein the housing of each flexible blade extends between the tread surface in its initial state and the bottom of the groove.

4. The tire tread according to claim 1, wherein the bottom of the groove further comprises a housing into which the bottom wall of each blade is inserted over a small height.

5. The fire tread according to claim 1, wherein the device for closing a groove is formed of a single flexible blade secured to a wall delimiting the groove and fixed in a housing provided in this wall, wherein the single flexible blade has an end wall designed to enter a housing formed in the other wall delimiting the same groove with the wall.

6. The tire tread according to claim 1, wherein at least one wall of a groove is inclined at an angle A different from zero degrees with respect to a direction perpendicular to the tread surface, and wherein the housing has a depth, inside which a flexible blade of the closure device is fixed, that decreases from the bottom of the groove towards the tread surface.

\* \* \* \* \*